United States Patent
Graf

[11] 3,826,556
[45] July 30, 1974

[54] HOLOGRAPHIC MEMORY WITH FLEXIBLE LIGHT CONDUCTING FIBERS

[75] Inventor: Peter Graf, Munich, Germany

[73] Assignee: Siemens Aktiengesellschaft, Berlin & Munich, Germany

[22] Filed: June 6, 1972

[21] Appl. No.: 260,136

[30] Foreign Application Priority Data
June 21, 1971  Germany............................ 2130831

[52] U.S. Cl. ................................ 350/3.5, 350/96 B
[51] Int. Cl. ........................................... G02b 27/00
[58] Field of Search...... 350/3.5, 96 B; 340/173 LT, 340/173 LS

[56] References Cited
UNITED STATES PATENTS
3,575,485  4/1971  Van Buskirk.......................... 350/3.5
3,675,983  7/1972  La Macchia........................... 350/3.5

*Primary Examiner*—Ronald J. Stern
*Attorney, Agent, or Firm*—Hill, Gross, Simpson, Van Santen, Steadman, Chiara & Simpson

[57] ABSTRACT

A device for recording information as a sub-hologram or a single holographic frame of a matrix of holographic frames on a holographic storage medium having an illuminating source having a beam-splitting device which provides a reference beam which is projected through a beam expansion system onto the holographic storage medium and an object beam which is expanded by an optical beam expansion system, which expanded beam is focused by an optical lens system through an information mask onto the storage medium to form the sub-hologram or single holographic frame characterized by the object beam being conducted from the beam-splitting device to the optical beam expansion system by at least one flexible light conducting fiber and by the end of the fiber, the optical beam expansion system and the optical lens system being mounted on a structural unit with their optical axes on a single optical axis and by the structural unit having pivotal movement around a center of rotation lying on the single optical axis. Preferably, the lenses of the optical beam expansion system are movable relative to the lens of the optical lens system to maintain the focal point in a given plane as the structural unit is pivoted on the center of rotation. If desired, the reference beam can be expanded by a beam expansion system and a light conducting fiber can be utilized for conducting the reference beam from the beam splitting device to the light expansion system, which may also be pivoted about a center of rotation.

8 Claims, 2 Drawing Figures

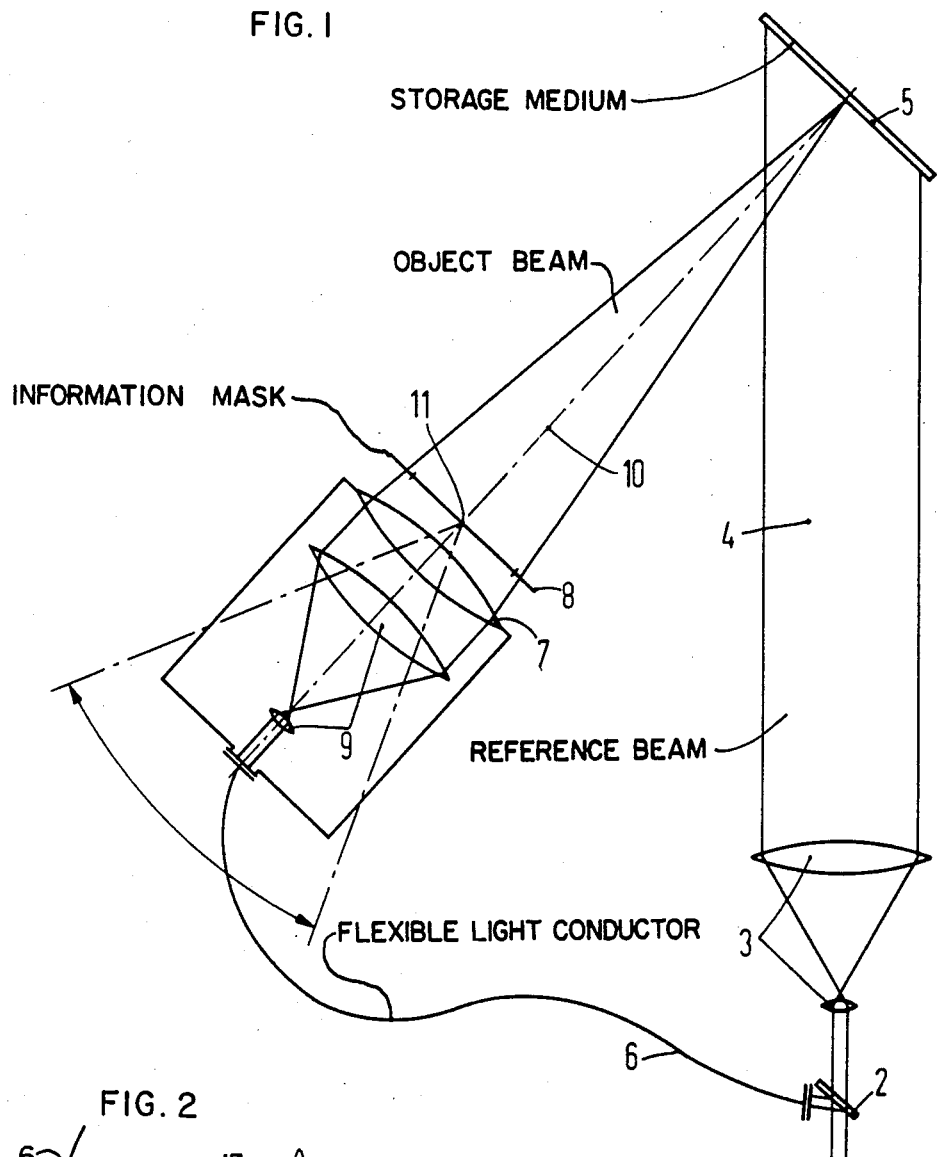
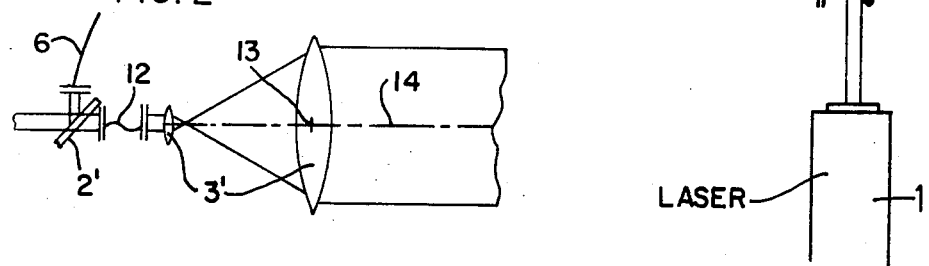

3,826,556

HOLOGRAPHIC MEMORY WITH FLEXIBLE LIGHT CONDUCTING FIBERS

BACKGROUND OF THE INVENTION

1. Field of the Invention

The present invention is directed to a device for recording information as sub-holograms or single holographic frame, which are in a matrix of holographic frames on a holographic storage medium.

2. Prior Art

In data processing, there is a continually increasing demand for large memories. Due to the high density of information which is capable of being stored in the cross section of a light beam, particular interest has been directed to optical memories.

If coherent light is modulated area-wise or in two-dimensional space, the information which is imparted by the modulation and transported by the light waves can be stored as a hologram. In this case, a unit of binary information (one bit) can be atrributed to each space frequency which is each interference strip system. The presence of the interference strip corresponds to a binary 1, and the absence of the interference strip corresponds to the binary 0. The point or dot upon the object surface corresponds to each bit whose associated interference field is stored evenly over the entire hologram surface and the dots are preferably arranged in space as a raster. If such a raster of dots or points is coherently illuminated from the side which is turned away from the hologram surface, the binary figures are written into the hologram in a parallel way.

In order to read in a parallel way each bit of information contained in a raster, a photo detector must be associated for each point or spot of the raster. Due to limited technical resources, it is impossible to read the entire contents of a large memory in a parallel way. However, the storage surface may be sub-divided into a plurality of small single holograhpic frames, whose capacity corresponds to a parallel readable fraction of the entire capacity, and whose capacity is usually found to be in the order of $10^3$ to $10^5$ bits. During the reading process, only a single holographic frame is reconstructed at a time by being illuminated by means of a reproducing beam from the cross section of the area of one of the holographic frames and the reproducing beam is directed across the storage surface by a deflection unit.

A storage capacity of a holographic storage medium is the product of the number of holographic frames times the capacity of each of the holographic frames. The number of holograhpic frames depends on the number of beam directions which can be produced by the deflection unit.

In order to record the holographic storage medium or plate with a holographic frame the illuminating beam has to be directed onto the location of the plate at which the holographic frame is to be recorded. It has been suggested that the beam guidance be accomplished by shifting of an optical lens system in its plane (see L. K. Anderson's "High Capacity Holographic Memories", 1969 Intermag Conference, Amsterdam). The high-storage densities which are provided by this practice require a large lens angle for the optical lens system. However, the aperture ratio and the diameter of the field of vision of an optical lens system are limited and the same limitations are applied to the storage capacity of a hologram storage medium so that the entire capacity which may be achieved is limited by the suggested guidance system to less than $10^7$ bits of information. This is due to the fact that the aperture ratio in optical lenses can only be larger than 1:1 by utilizing a large aperture and with great effort. In addition, the high requirements for quality in the lenses in view of corrections for lens imperfections increases the cost of the lenses for the optical system.

SUMMARY OF THE INVENTION

The present invention is directed to a device for recording information as a hologram on a storage medium utilizing illuminating means providing a reference beam directed onto the storage medium and an object beam, means for imparting information to the object beam and an optical lens system which only requires spherically corrected lenses which are relatively inexpensive. This is accomplished by utilizing at least one flexible light conducting fiber extending from the illuminating means and having an end terminating adjacent the optical lens system for conducting the object beam to the lens system, and means for mounting the end of the light conducting fiber and the optical lens system as a structural unit with their optical axes on a single optical axis. The mounting means provides pivotal movement for the structural unit about a center of rotation lying on a single optical axis so that the optical lens system is receiving para-axial light rays as it is pivoted to focus on different points on the storage medium. Preferably, an optical beam expansion system is provided between the end of the fiber and the optical lens system for increasing the width of the object beam and a lens of the expansion system is movable relative to the optical lens system to enable maintaining the focus point of the optical lens system on a given plane during pivoting of the structural unit around its center of rotation. In the preferred embodiment, the reference beam is also passed through a beam expansion system and the illuminating source includes a beam splitting device utilizing a partially translucent mirror. If desired, a flexible light conducting fiber can be utilized to conduct the light from the beam splitting device to the beam expansion system for the reference beam.

BRIEF DESCRIPTION OF THE DRAWINGS

FIG. 1 is a schematic illustration of the device according to the present invention, and FIG. 2 is a partial schematic illustration of FIG. 1 illustrating a modification in the means for providing the reference beam.

DESCRIPTION OF THE PREFERRED EMBODIMENT

The principles of the present invention are particularly useful in a device for recording information as a hologram on a storage medium which is schematically illustrated in the Figure. The device has an illuminating means such as a laser 1 fixed in space whose laser beam goes to a beam-splitting device illustrated as a partially translucent mirror 2. From the beam splitting device, a portion of the beam passes through a beam expansion system 3 illustrated as a pair of lenses to produce an expanded reference beam 4 directed onto the storage medium such as a storage plate 5.

A portion of the light reflected by the partially translucent mirror 2 is received by a flexible light conductor such as a flexible light conducting fiber 6 which extends from the beam-splitting device and has an end terminating adjacent an optical lens system 7. Preferably, the light beam of the object wave carried by the fiber 6 is passed to an optical beam expansion system 9 comprising a pair of lenses prior to being received by the lens or lenses of the optical lens system 7. The beam is focused by the optical lens system 7 and passes through a means for imparting information to the object beam such as an information mask 8, and is focused onto a small area such as a focal point on the storage medium or plate 5. The end of the fiber 6, the optical beam expansion system 9 and the optical lens system 7 are all mounted by a mounting means as a structural unit with their optical axes lying on a single optical axis 10. The mounting means provides pivotal movement around a center or rotation 11 which lies on the single optical axis 10 so that the optical axis 10 moves in a single plane. By having the optical axis of the end of the fiber 6 on the axis 10, the optical lens system 7 has to focus only a parallel extending beam as it is rotated about the center of rotation. As illustrated, the center of rotation 11 is preferably in the plane of the information mask 8.

Preferably, the lenses of the optical beam expansion system 9 are shiftable with respect to each other in such a way that the focus point created by the optical lens system remains in the plane of the holographic storage plate 5 as the structural unit consisting of the systems 7, 9 and the end of the light conductors 6 are pivoted about the center of rotation 11 of the optical axis 10.

It is also possible to arrange a flexible light conducting fiber 12 (FIG. 2) in the path of the reference beam between the partially translucent member or mirror 2' and the beam expansion system 3' which in this case may also be pivotable in order to direct the reference beam 4 to the desired point on the storage plate 5. If the expansion system 3' is mounted for pivotal movement, it is arranged to pivot about a point 13 on its optical axis 14 so that the optical axis of the system 3 and the end of the fiber coincide.

Since the optical lens system only focuses paraxial beams as it focuses the object beam on different points on the storage medium or plate 5, the total capacity which may be recorded on the storage medium or plate 5 is independent of the aperture ratio of the optical lens system 7. In addition and for the same reasons, the lenses utilized in the optical lens are comparatively cheap since only spherically corrected lenses are required.

Although various minor modifications might be suggested by those versed in the art, it should be understood that I wish to embody within the scope of the patent granted hereon all such modifications as reasonably and properly come within the scope of my contribution to the art.

I claim:
1. In a device for recording information on a holographic storage medium comprising illuminating means providing a reference beam directed onto the storage medium and an object beam, means for imparting information to the object beam, and an optical lens system for focusing the object beam onto the storage medium to record a holographic frame containing the information thereon, the improvements comprising at least one light conducting fiber extending from said illuminating means and having an end terminating adjacent the optical lens system for conducting the object beam to the optical lens system, and means for mounting the end of the light conducting fiber and the optical lens system as a structural unit with their optical axes on a single optical axis, said mounting means providing pivotal movement for the structural unit about a center of rotation lying on the single optical axis.

2. In a device according to claim 1, which includes an optical beam expansion system for increasing the width of the object beam on the structural unit between the end of the fiber and the optical lens system with its optical axis lying on the single optical axis.

3. In a device according to claim 2 wherein the lens of the optical beam expansion system are shiftable relative to the lens of the optical lens system so that the focal point of the optical lens system remains on a single plane as the structural unit is pivoted about its center of rotation.

4. In a device according to claim 2, wherein the illuminating means includes a beam splitting device having a partially translucent mirror, and said light conducting fiber extends from the beam splitting device to the optical beam expansion system.

5. In a device according to claim 4, which further includes a beam expansion system for expanding the width of the reference beam prior to being directed onto the storage medium.

6. In a device according to claim 5, which further includes at least one light conductor fiber for conducting the reference beam from the beam splitting device to the beam expansion system of the reference beam.

7. In a device according to claim 6, wherein the beam expansion system of the reference beam is mounted for pivotal movement around a center of rotation lying on its optical axis.

8. In a device according to claim 2, wherein the means supporting the information mask and the optical lens system are arranged so that the optical lens system directs the object beam through the information mask as the object beam is focused onto the storage medium.

* * * * *